S. M. MICHELSON,

Assignor, by direct and mesne assignments, of one-third to G. SYLVESTER and A. RICHTER, JR.

CASTER.

No. 10,627. Reissued July 21, 1885.

Witnesses:

E. G. Penner

R. Platz

Inventor:

Sigismund M. Michelson

By Frank Underwood

Attorneys.

N. PETERS. Photo-Lithographer, Washington, D. C.

UNITED STATES PATENT OFFICE.

SIGISMUND M. MICHELSON, OF MILWAUKEE, WISCONSIN, ASSIGNOR, BY DIRECT AND MESNE ASSIGNMENTS, OF ONE-THIRD TO GEORGE SYLVESTER AND AUGUST RICHTER, JR., OF SAME PLACE.

CASTER.

SPECIFICATION forming part of Reissued Letters Patent No. 10,627, dated July 21, 1885.

Original No. 280,061, dated June 26, 1883. Application for reissue filed June 22, 1885.

*To all whom it may concern:*

Be it known that I, SIGISMUND M. MICHELSON, of Milwaukee, in the county of Milwaukee, and in the State of Wisconsin, have invented certain new and useful Improvements in a Combined Trunk-Roller and Corner-Iron; and I do hereby declare that the following is a full, clear, and exact description thereof.

My invention relates especially to rollers journaled in the corner-irons of trunks; and it consists in certain peculiarities of construction, as will be set forth hereinafter, and pointed out in the claims.

Figure 4:
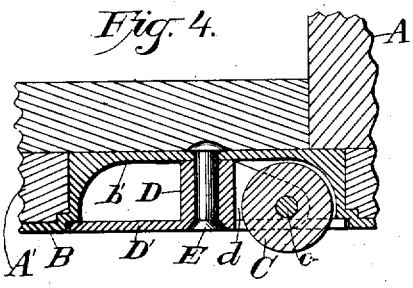
Figure 5:
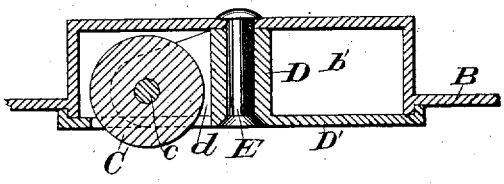
Figure 3:
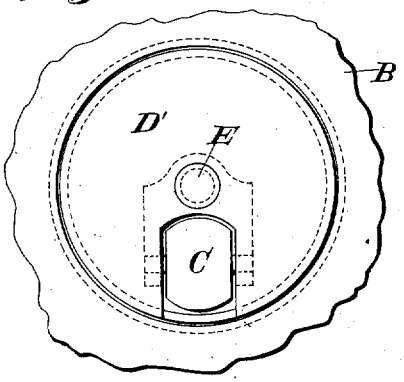
Figure 2:
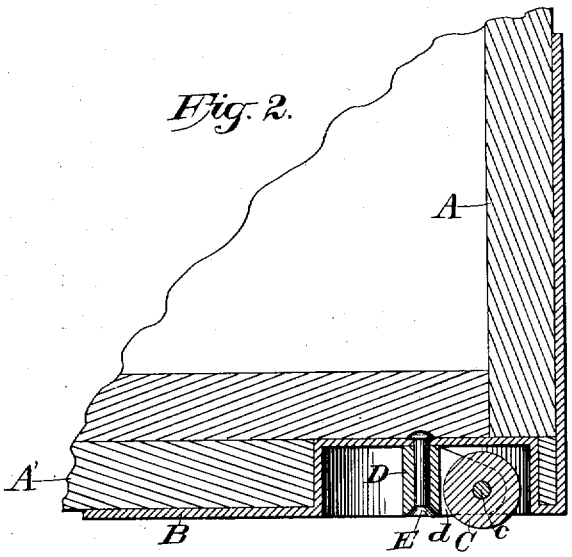
Figure 1:
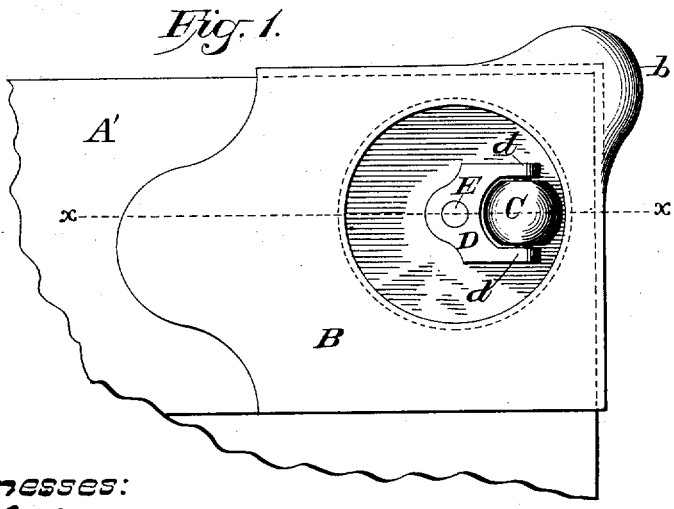

In the drawings, Figure 1 is a bottom view of one form of my device. Fig. 2 is a cross-section of the same on the line *x x* of Fig. 1. Fig. 3 is a bottom view of a modified construction. Fig. 4 is a cross-section of the form shown in Fig. 3. Fig. 5 is a sectional view showing a slightly modified form of the protecting-disk.

A A′ represent parts of the frame of a trunk, and B is a corner-iron applied thereto, which may be provided with a projecting bumper, *b*, as shown. The bottom part of the corner-iron is provided with a circular well, *b′*, to receive and protect the roller C and its journal and bearings. The said bearings consist, primarily, of what I term a "horse-shoe" frame, consisting of a vertical hub or perforated shank, D, having forks or arms *d d*, projecting horizontally therefrom, which are horizontally perforated to receive the journal *c* of the roller C, which is thus sustained between the arms *d d*, the said hub and its arms preferably not extending below the bottom edge of the well, but being inclosed in and protected thereby, and the hub of the roller is secured to the bottom of the corner-iron by a vertical bolt, E, which may be upset at each end or secured by a nut, as preferred.

In the simplest form of my device, Figs. 1 and 2, I have shown the well left open at the base; but in the other views I have shown a protecting circular disk or plate, D′, integral with or secured to the hub and its arms, and cut away to allow the roller C to project through, but elsewhere wholly covering the well *b′*. The object of this plate is to effectually guard against the admission of dirt, snow, pebbles, or other foreign matter which might otherwise get into the well, and possibly prevent the hub from freely revolving or otherwise interfere with the roller, and its periphery is designed to either move in a shoulder provided for it at the bottom of the circular vertical wall of the well, as shown in Fig. 4, or else to be provided with a slight circular flange to encircle the slightly projecting circular vertical wall of said well, as shown in Fig. 5. As this plate D′ adds slightly to the cost of my device I propose to use it with the more expensive style of trunks, and employ the simpler form, without this plate, for the cheaper trunks.

My device can be very readily and quickly applied to trunks, it being only necessary to saw or bore out the bottom strip, A′, so as to leave room for the projecting well, and then to fasten the plates of the corner-iron to the trunk in the usual manner. A trunk thus equipped can be instantly and easily moved in any direction, while at the same time, as the hub and bearings of the roller are sustained wholly within the described well, they are guarded against the danger of coming in contact with obstacles, and thus being broken off, for as only a small portion of the roller projects below the bottom of the trunk should any obstacle strike the same it would only serve to swing the roller around on its pivot E out of the way, without injury thereto.

Instead of being strictly vertical, the inner walls of the well may be somewhat rounded or inclined, as shown in Fig. 4, whereby there would be less room for any foreign substance to lodge between said wall and the roller as the latter was carried around the circle of the well, and the periphery of this roller is intended to be very close to the said wall, so as to almost but not quite touch it at all times in its sweep.

I am aware that a roller-plate has been pivoted to a lug on a depressed plate, and do not claim such; but,

Having thus described my invention, what

I claim as new, and desire to secure by Letters Patent, is—

1. A trunk-roller journaled between the arms of a swinging frame having a vertical hub and a protecting-plate, all solid or integral with each other, the said hub being pivoted to the center of a depressed plate having protecting and downward-projecting walls, the journals of said roller being entirely above the protecting-plate, which is perforated to allow the roller to project through, but otherwise entirely covering the well or recess within which the roller-bearing moves, substantially as set forth.

2. A combined trunk-roller and corner-iron, the latter having a corner-bumper and a depression or recess in which the roller moves, the latter being journaled between the arms of a swinging frame having a solid hub and solid covering-plate, cut away to allow the roller to project through, but inclosing the journals of the roller and their bearing-frame, substantially as set forth.

3. In a caster, the combination of the shell or well, and central vertical pin or axle, E, with the horseshoe-frame having hub D and arms *d d* solid therewith, and extending horizontally therefrom, substantially as set forth.

4. In a caster, the combination of the shell or well, and central vertical pin or axle E, depending from the top plate of the shell, the horseshoe-frame with hub D and arms *d d* solid therewith and extending horizontally therefrom, journal *c* pivoted in the outer ends of said arms, and bearing-roller C between them, substantially as set forth.

5. In a caster, the roller-bearing consisting of a horseshoe-frame having a perforated hub for attachment to a downwardly-projecting pin or axle, and forks or arms extending horizontally from the hub and adapted to support the roller between them, as set forth.

SIGISMUND M. MICHELSON.

Witnesses:
S. S. STOUT,
G. A. PLATZ.